(12) United States Patent
Shirasawa

(10) Patent No.: US 6,182,532 B1
(45) Date of Patent: Feb. 6, 2001

(54) CUP-TYPE WAVE GEAR DEVICE

(75) Inventor: Naomi Shirasawa, Nagano-ken (JP)

(73) Assignee: Harmonic Drive Systems, Inc., Tokyo (JP)

( * ) Notice: Under 35 U.S.C. 154(b), the term of this patent shall be extended for 0 days.

(21) Appl. No.: 09/333,023

(22) Filed: Jun. 15, 1999

(30) Foreign Application Priority Data

Jun. 19, 1998 (JP) .................................................. 10-171968

(51) Int. Cl.$^7$ .................................................. F16H 33/00
(52) U.S. Cl. .................................................. 74/640
(58) Field of Search ........................... 74/640; 403/319, 403/315; 411/321, 224, 216

(56) References Cited

U.S. PATENT DOCUMENTS

| | | | |
|---|---|---|---|
| 216,222 | * 6/1879 | Schifferly | 403/309 |
| 3,424,432 | * 1/1969 | Humphreys | 74/640 |
| 4,235,556 | * 11/1980 | Dewey et al. | 74/640 X |
| 4,770,059 | 9/1988 | Beyer . | |
| 4,784,014 | 11/1988 | Bruns et al. . | |
| 4,825,720 | 5/1989 | Capdepuy . | |
| 4,840,090 | 6/1989 | Iwata . | |
| 4,909,098 | 3/1990 | Kiryu . | |
| 5,222,409 | 6/1993 | Dalakian . | |
| 5,388,483 | 2/1995 | Ishida et al. . | |
| 5,642,645 | * 7/1997 | Foley et al. | 74/640 |
| 5,772,573 | * 6/1998 | Hao | 74/640 X |

FOREIGN PATENT DOCUMENTS

2060123A * 4/1981 (GB) ...................................... 74/640

* cited by examiner

Primary Examiner—Charles A. Marmor
Assistant Examiner—Roger Pang
(74) Attorney, Agent, or Firm—Burns, Doane, Swecker & Mathis, L.L.P.

(57) ABSTRACT

A cup-type wave gear device 1 comprises a cup-shaped flexible external gear 4 which has a boss 43 formed at its outer circumferential surface with an external thread 43b. An output shaft 6 is formed on Its end surface with an annular recess whose inner circumferential surface is formed with an internal thread 61. The external thread 43b of the boss 43 is screwed into the internal thread 61 of the output shaft 6. Further, driving pins 8 are used to fasten the boss 43 to the output shaft 6. Whereby, the flexible external gear 4 is fixedly connected to the output shaft 6 The fastening torque between the boss and the output shaft can be increased in comparison with the conventional case where fastening bolts are used to connect these parts.

7 Claims, 1 Drawing Sheet

CUP-TYPE WAVE GEAR DEVICE

FIELD OF THE INVENTION

This invention relates to a cup-type wave gear device having a flexible external gear of a cup shape. More specifically, this inventions pertains to a fastening structure of a flexible external gear and an output member of a cup-type wave gear device.

PRIOR ART DESCRIPTION

There has been known a wave gear device referred to as the cup-type which is provided with a cup-shaped flexible external gear. This type of wave gear device has a circular rigid internal gear, a cup-shaped flexible external gear disposed inside the rigid internal gear, and a wave generator for flexing the flexible external gear into a non-circular shape to mesh it partially with the rigid internal gear and for shifting meshing portions of these gears in a circumferential direction.

The cup-shaped flexible external gear is generally constituted by an annular body formed with external teeth, a circular diaphragm plate extending radially and inwardly from one end of the body, and a thick boss formed integrally on the inner peripheral edge of the diaphragm plate.

The number of teeth of the flexible external gear is different from that of the rigid internal gear by 2n (n: positive Integer), and generally is two less than that of the rigid internal gear. In this case, the flexible external gear is flexed into an elliptical shape by the wave generator so that it meshes with the rigid internal gear at both ends along the major axis of the elliptical shape.

The wave generator is driven to rotate at a high speed by a high-speed rotational source such as a motor so that the meshing portions of both gears move circumferentially, which causes to generate relative rotation between the gears in accordance with the difference In number of teeth between them. Typically, the rigid internal gear is fixed not to rotate, and a rotational output of a greatly reduced speed is derived from the flexible external gear and is transferred to the side of an output shaft.

The flexible external gear is fixedly connected at its boss to an output shaft In a coaxial state by means of fastening bolts which are inserted into the boss and arranged concentrically.

In the flexible external gear, the boss thereof fixedly connected to the output shaft has an outer diameter which is smaller than that of the annular body formed with the external teeth. More specifically, the annular body is flexed elliptically at Its opening end by the wave generator, which may cause to occur stress concentration where the annular body is connected to the diaphragm plate supported by the boss. In order to avoid this stress concentration, the diaphragm plate connected between the boss and body must have a prescribed radial length. This inevitably reduces the outer diameter of the boss connected on the inner circumferential edge of the diaphragm plate.

As a result, the fastening bolts for fixedly connecting the boss with the output shaft must be arranged concentrically on the boss having a small diameter, which cannot assure a large fastening torque.

There has been known a method of assuring a large fastening torque even if the diameter of the boss is small, wherein the boss is constituted to have a small-diameter part continued to an inner peripheral edge of the diaphragm plate and a large-diameter part which is Integrally formed with and arranged axially adjacent to the small-diameter part, and the large-diameter part is connected with the output shaft by fastening bolts. When the flexible external gear having the boss of the above shape, which is so called as the wineglass-shaped flexible external gear, is used, the fastening torque between the flexible gear and the output shaft can be increased, but the axial length of the flexible external gear is also increased by an amount that the large-diameter part is formed. This is an obstacle to making the device small and compact.

An object of this invention is to realize a cup-type wave gear device which is able to increase a fastening torque between a flexible external gear and an output shaft without increasing the side of the device.

SUMMARY OF THE INVENTION

In order to achieve the above and other objects, according to this invention, a cup-type wave gear device having a circular rigid internal gear, a cup-shaped flexible external gear disposed inside the rigid internal gear, and a wave generator inserted into the flexible external gear for flexing the flexible external gear into a non-circular shape to mesh it partially with the rigid internal gear and for shifting meshing portions circumferentially to produce relative rotation between the gears, characterized in that it has an output member and a fastening means for fastening the output member to the flexible external gear, wherein the flexible external gear has an annular boss formed with external teeth, a circular diaphragm plate extending radially and inwardly from one end of the body, and a boss integrally connected to an inner peripheral edge of the diaphragm plate and projecting from the diaphragm plate in a device axial direction, and wherein the fastening means includes a screw fastening mechanism constituted between the boss and the output member.

The screw fastening mechanism may comprise an external thread formed on an outer circumferential surface of the boss and an internal thread formed on an inner circumferential surface of the output member, whereby the boss is screwed into the output member.

With the screw fastening means to screw the boss into the output shaft, it is possible to increase the fastening torque in comparison with the case where fastening bolts are used to fasten it to the output member.

In order to increase the fastening torque further more, driving pins are preferably used to fasten the boss and the output member, together with the screw fastening mechanism. It is also preferable that adhesive is used to connect the boss to the output member as well as the screw fastening mechanism. It is, of course, more preferable that the driving pins and adhesive are both used, together with the screw fastening mechanism.

On the other hand, it is possible to form through holes in the boss and wave generator, whereby a hollow-type wave gear device can be realized which has a hollow portion extending along a device axial direction.

DETAILED DESCRIPTION OF THE PREFERRED EMBODIMENT

Figure 1:
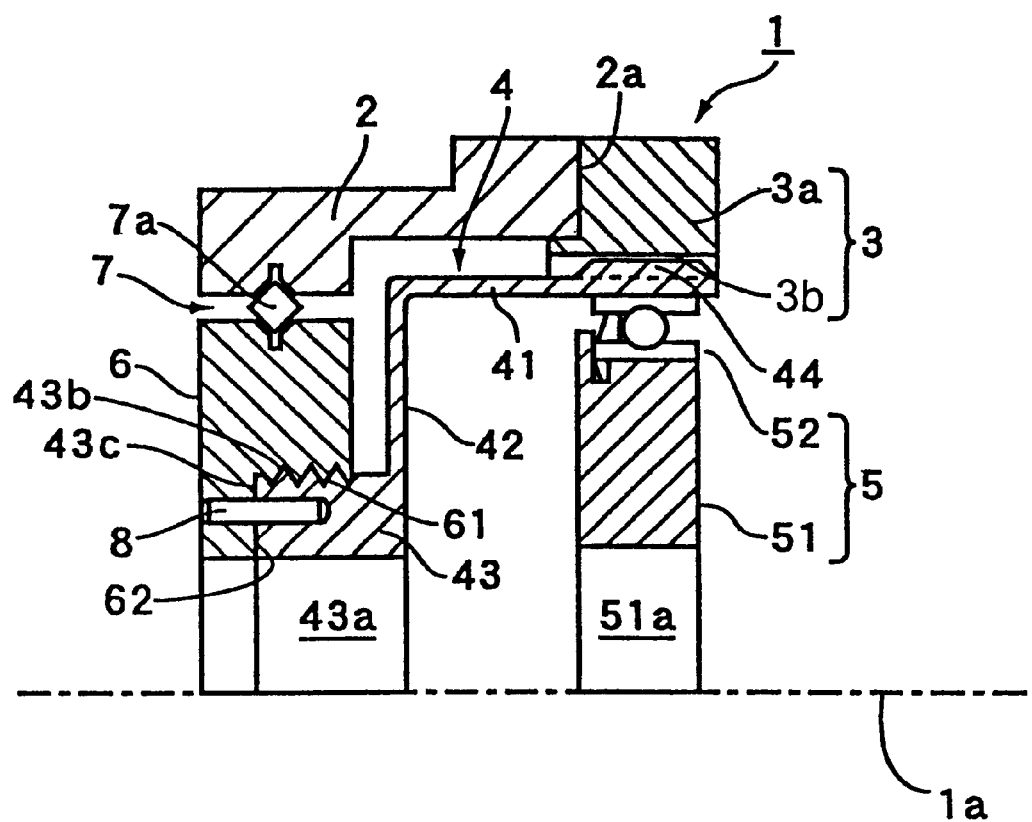
FIG. 1 is a half sectional view showing a main part of a cup-type wave gear device according to this invention.

With reference to FIG. 1, wherein a half section of a cup-type wave gear device according to this invention is shown, the cup-type wave gear device 1 comprises an annular device housing 2 having an circular end 2a, to which a rigid internal gear 3 is fixedly connected. (The rigid internal gear 3 has a circular gear main body 3a of a rectangular section and inner teeth 3b formed on an inner circumferential surface of the gear main body 3a.

Inside the rigid internal gear 3, is coaxially arranged a cup-shaped flexible external gear 4 which comprises a thin annular body 41, a circular diaphragm plate 42 integrally connected to an end of the body 41 and extending radially and inwardly, a boss 43 integrally connected to an inner peripheral edge of the diaphragm plate 42, and external teeth 44 formed on an outer circumferential surface part at an open side of the body 41. The boss 43 is of an annular shape formed at its center with a through hole 43a, and is projected toward one side along a device axial direction with respect to the diaphragm plate 42.

A wave generator 5 having an elliptical profile is inserted into the inner side of the body 41 of the flexible external gear4 where the external teeth 44 are formed. The wave generator 5 has an elliptical rigid cam plate 51 and a bearing 52 fixed on an outer circumferential surface of the rigid cam plate 51. The rigid cam plate 51 is formed at its center with a through hole 51a. The thus constituted wave generator 5 is connected to a drive source of high rotational speed such as the output shaft of a motor (not shown).

The boss 43 of the flexible external gear 4 is connected with an output shaft (output member) 6. The output shaft 6 of this example is a hollow shaft and formed integrally on its outer circumferential surface with an inner race of a cross roller bearing 7, An outer race of the cross roller bearing 7 is integrally formed on an inner circumferential surface portion of the device housing 2 where the inner race formed on the outer circumferential surface of the output shaft 6 faces. Between the inner and outer races, a number of cross rollers 7a are arranged along a circumferential direction so that they are able to roll on the inner and outer races. Thus, the output shaft 6 is rotatably supported on the device housing 2 by means of the cross roller bearing 7.

The output shaft 6 has an end surface portion formed with an annular recess coaxially, on an inner circumferential surface of which an internal thread 61 is formed. While, an external thread 43b which are engageable with the internal thread 61 is formed on the outer circumferential surface of the boss 43 of the flexible external gear 4. Where the boss 43 is screwed into the output shaft 6, an annular end surface 43c of the boss 43 is just in contact with an annular bottom surface 62 of the annular recess of the output shaft 6.

Further, from an opposite end surface of the output shaft 6, a plurality of driving pins 8 arranged concentrically are driven into and passed through the output shaft 6, and are driven into the boss 43 from its end surface 43c to fix thereto.

Furthermore, adhesive is filled in contact portions between the output shaft 6 and the boss 43 to adhere with each other, for example, the external thread 43b is adhered to the internal thread 61, and the boss end surface 43c is adhered to the circular bottom surface 62 of the annular recess of the output shaft 6.

In the cup-type wave gear device 1 as constituted above, the flexible external gear 4 is fastened to the output shaft 6 by screw fitting, and at the same time by the driving pins 8 and adhesive. Hence, a large fastening torque can be assured compared to the conventional case where these parts are fastened by the fastening bolts.

Further, when a hollow-type wave gear device is constituted, the boss 43 can be formed therein with a through hole having an inner diameter larger than when the fastening bolts are used to fasten the flexible external gear and the output shaft as conventionally. This makes it possible to realize a wave gear device having a hollow portion larger than that of the conventional wave gear device.

Furthermore, according to this example, the fastening torque between the boss and the output shaft can be increased without increasing the axial length, different from the conventional wineglass-type wave gear device.

In the above example, the fastening means for fastening the boss and the output shaft includes the screw fastening mechanism, driving pins, and adhesive filled between these parts. Only the screw fastening mechanism may be used, instead, combination of screw fastening mechanism and the driving pins or of screw fastening mechanism and adhesive may also be used.

In addition, the above example relates to the hollow-type wave gear device having through holes formed in the boss and the wave generator. This invention can be adopted to a solid type wave gear device as well.

As mentioned above, in the cup-type wave gear device according to this invention, the flexible external gear and the output member are fastened by screw fitting, screw fitting and driving pins, screw fitting and adhesive, or screw fitting, driving pins and adhesive.

Thus, according to this invention, a large fastening torque can be assured compared to the case where fastening bolts are used to fasten the flexible external gear to the output member. Further, the device size, particularly the axial length of the wave gear device can be reduced compared to the conventional wineglass-type wave gear device. Furthermore, a wave gear device having a large hollow portion compared to the case where the fastening bolts are used to connect the flexible external gear and the output member.

What is claimed is:

1. A cup-type wave gear device having a circular rigid internal gear, a cup-shaped flexible external gear disposed inside the rigid internal gear, and a wave generator inserted into the flexible external gear for flexing the flexible external gear into a non-circular shape to mesh it partially with the rigid internal gear and for shifting meshing portions circumferentially to produce relative rotation between the gears, comprising:

a device housing, an output member, a bearing for rotatably supporting the output member on the device housing, and a fastening means for coaxially fastening the output member to the flexible external gear, wherein the flexible external gear has an annular body formed with external teeth, a circular diaphragm plate extending radially and inwardly from one end of the body, and a boss integrally connected to an inner peripheral edge of the diaphragm plate and projecting from the diaphragm plate in a device axial direction, wherein the fastening means includes at least a screw fastening mechanism which comprises an external thread formed on an outer circumferential surface of the boss and an internal thread formed on an inner circumferential surface of the output member, wherein the bearing has an inner race integrally formed on an outer circumferential surface of the output member; and wherein the output member has an end surface portion formed coaxially with an annular recess, the internal thread being formed on an inner circumferential surface of the recess, and the boss being screwed into the output member in a manner that an end surface of the boss is in contact with a bottom surface of the annular recess of the output member.

2. The cup-type wave gear device according to claim 1, wherein the bearing has an outer race integrally formed on an inner circumferential surface of the device housing.

3. The cup-type wave gear device according to claim 1, wherein the fastening means further includes driving pins driven into the boss and the output member, the driving pins being driven into the output member and the boss from an end surface of the output shaft opposite to the end surface portion formed with the annular recess.

4. The cup-type wave gear device according to claim 1, wherein the fastening means further includes adhesive for connecting the boss and the output shaft.

5. The cup-type wave gear device according to claim 3, wherein the fastening means further includes adhesive for connecting the boss and the output shaft.

6. The cup-type wave gear device according to claim 1, wherein the output member, the boss and the wave generator are formed with coaxial through holes.

7. The cup-type wave gear device according to claim 3, wherein the output member, the boss and the wave generator are formed with coaxial through holes.

* * * * *